(12) United States Patent
Chen et al.

(10) Patent No.: US 8,780,134 B2
(45) Date of Patent: Jul. 15, 2014

(54) ACCESS TO CONTROL OF MULTIPLE EDITING EFFECTS

(75) Inventors: Wei-Chao Chen, Chang Hua (TW); Natasha Gelfand, Sunnyvale, CA (US); Chia-Kai Liang, Fengshan (TW)

(73) Assignee: Nokia Corporation, Espoo (FI)

( * ) Notice: Subject to any disclaimer, the term of this patent is extended or adjusted under 35 U.S.C. 154(b) by 494 days.

(21) Appl. No.: 12/570,422

(22) Filed: Sep. 30, 2009

(65) Prior Publication Data

US 2011/0074809 A1    Mar. 31, 2011

(51) Int. Cl.
*G09G 5/00* (2006.01)
*G06F 3/0488* (2013.01)
*G06T 11/60* (2006.01)
*G06T 19/00* (2011.01)

(52) U.S. Cl.
CPC .............. *G06F 3/0488* (2013.01); *G06T 11/60* (2013.01); *G06T 19/00* (2013.01)
USPC ........... 345/619; 345/419; 345/169; 345/173; 715/764; 715/769; 715/850; 715/851; 715/854; 715/861

(58) Field of Classification Search
CPC ........ G06F 3/0488; G06T 11/60; G06T 19/00
USPC .......... 345/419, 619, 169–173; 715/769, 850, 715/764, 851, 854, 861
See application file for complete search history.

(56) References Cited

U.S. PATENT DOCUMENTS

| | | | |
|---|---|---|---|
| 6,408,109 B1 | 6/2002 | Silver et al. | |
| 6,469,709 B1 * | 10/2002 | Sakai | 345/619 |
| 7,155,676 B2 * | 12/2006 | Land et al. | 715/731 |
| 7,567,713 B2 | 7/2009 | Ding | |
| 2005/0007370 A1 * | 1/2005 | Hunter et al. | 345/473 |
| 2006/0117108 A1 | 6/2006 | Salisbury et al. | |
| 2006/0214935 A1 * | 9/2006 | Boyd et al. | 345/473 |
| 2008/0112005 A1 | 5/2008 | Murray et al. | |
| 2008/0165141 A1 * | 7/2008 | Christie | 345/173 |
| 2008/0238880 A1 | 10/2008 | Miwa | |
| 2008/0297483 A1 * | 12/2008 | Kim et al. | 345/173 |

(Continued)

FOREIGN PATENT DOCUMENTS

| | | |
|---|---|---|
| EP | 0869424 A2 | 10/1998 |
| RU | 2310912 C1 | 11/2007 |

(Continued)

OTHER PUBLICATIONS

Caolo, Dave, "Kindle App for iPhone Updated"; Publication date: May 20, 2009; <http://www.tuaw.com/2009/05/20/20/kindle-app-for-iphone-updated/>.

(Continued)

*Primary Examiner* — Jin-Cheng Wang
(74) *Attorney, Agent, or Firm* — Alston & Bird LLP

(57) ABSTRACT

An apparatus includes means for associating a first editing effect with a first editing direction; means for associating a second editing effect with a second editing direction; means for receiving an editing input indicating an input direction and an input length; means for determining an editing degree according to a corresponding length of said input length in an editing direction by extracting a component corresponding to the input in the editing direction; and means for applying said associated editing effect in a degree according to the editing degree to an image.

27 Claims, 10 Drawing Sheets

(56) References Cited

U.S. PATENT DOCUMENTS

| | | | | |
|---|---|---|---|---|
| 2009/0147297 A1* | 6/2009 | Stevenson | ................ | 358/1.15 |
| 2009/0160809 A1* | 6/2009 | Yang et al. | ................ | 345/173 |
| 2009/0313567 A1* | 12/2009 | Kwon et al. | ................ | 715/769 |
| 2009/0315867 A1* | 12/2009 | Sakamoto et al. | ............ | 345/184 |
| 2010/0177051 A1* | 7/2010 | Bilow | ................ | 345/173 |
| 2010/0251186 A1* | 9/2010 | Park | ................ | 715/850 |

FOREIGN PATENT DOCUMENTS

| | | |
|---|---|---|
| WO | 9927485 A2 | 6/1999 |
| WO | WO 00/34918 A1 | 6/2000 |
| WO | WO 01/07893 A2 | 2/2001 |
| WO | 0217233 A2 | 2/2002 |
| WO | 2006052674 | 5/2006 |

OTHER PUBLICATIONS

"BenQ T850"; Publication date: Jun. 3, 2008; <http://www.dcameramag.com/tag/benq/>.

"Night-Time Mode"; <http://www.cookwareinc.com/TapTapDial/>.

"High Fidelity Fun"; <http://www.hcii.cmu.edu/M-HCI/2008/DMD%20website/iteration.html>.

International Search Report dated Jan. 21, 2011.

Written Opinion dated Jan. 21, 2011.

International Search Report and Written Opinion for International Application No. PCT/IB2010/054305, completed Jan. 27, 2011.

Lischinski, D., et.al; "Interactive Local Adjustment of Tonal Values" 2006 ACM Trans. Graph 3, 646-653, found at: http://lvelho.impa.br/outgoing/corbo/anat-color.mat/.

Yang, S., et al.; "Bilateral Interpolation Filters for Image Size Conversion", Image Processing, 2005. ICIP 0-7803-9134-9.

Eisemann, E., and Durand, F.; "Flash Photography Enhancement Via Intrinsic Relighting"; 2004; ACM Trans. Graph. 23, 3, 673-678.

Levin, A., Lischinski, D.,and Weiss, Y.; "A Closed-Form Solution to Natural Image Matting"; 2008, IEEE Trans. PAMI 30, 2, 228-242.

Chen, J., Paris, S., and Durand, F.; "Real-Time Edge-Aware Image Processing with the Bilateral Grid"; ACM Trans. Graph. 26, 3, 103, Jul. 2007.

* cited by examiner

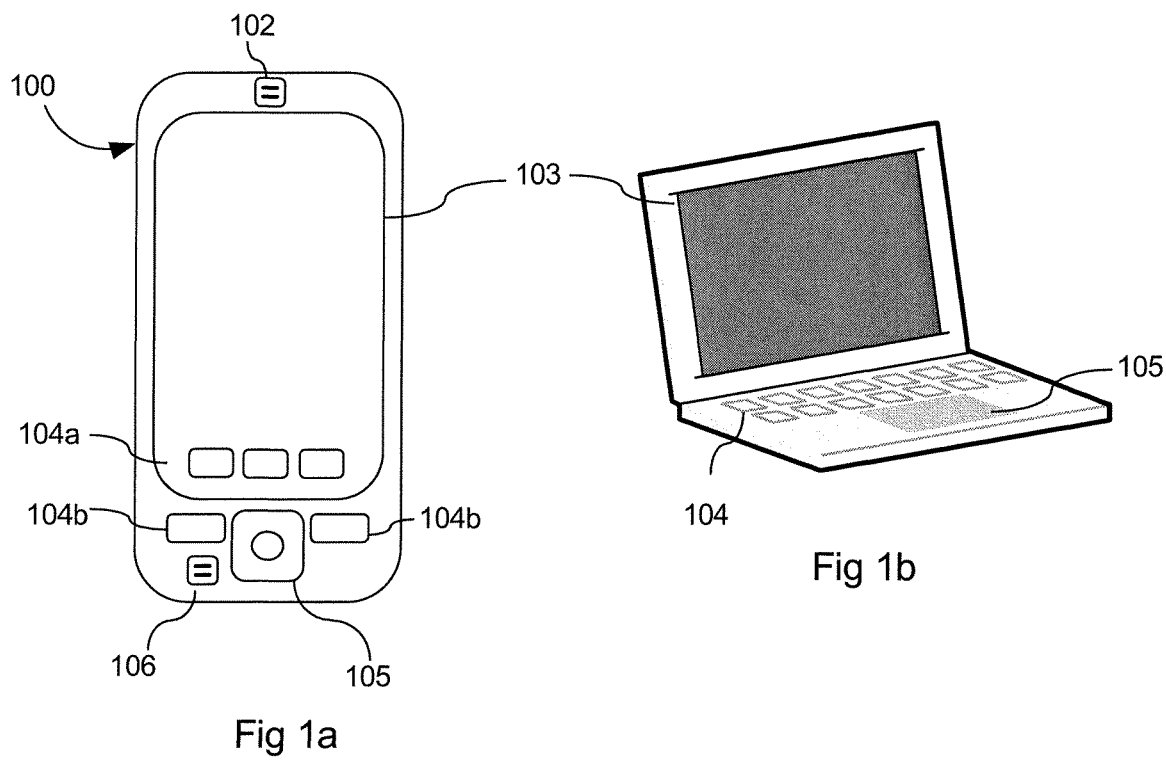
Fig 1a
Fig 1b
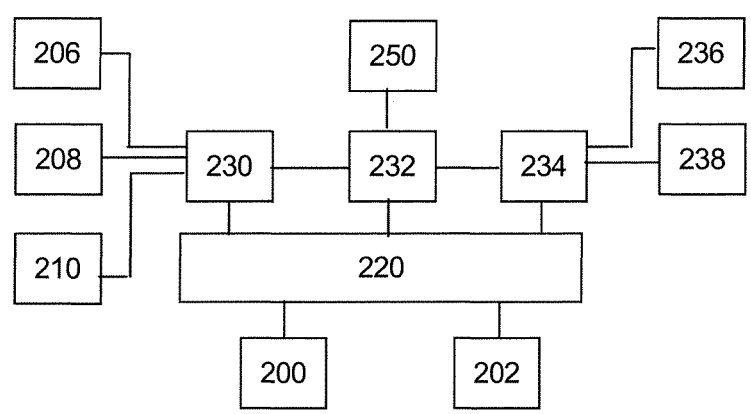
Fig 2

ACCESS TO CONTROL OF MULTIPLE EDITING EFFECTS

CROSS-REFERENCE TO RELATED APPLICATIONS

This application is related to U.S. application Ser. No. 12/570,448, filed on 30 Sep. 2009, entitled SELECTION OF A REGION, by Wei-Chao Chen, Natasha Gelfand, and Chia-Kia Liang, the disclosure of which is incorporated herein by reference in its entirety.

FIELD

The present application relates to a user interface, an apparatus and a method for allowing access to controlling the application of an effect to an image, and in particular to a user interface, an apparatus and a method for allowing access to controlling the application of an image editing effect using a simple input.

BACKGROUND

More and more electronic devices such as mobile phones, MP3 players, Personal Digital Assistants (PDAs) and computers such as netbooks, laptops and desktops are being used to edit and transform images.

An image can be edited in many ways including changing color tone, color saturation, lightness, high tones, low tones, middle tones, contrast and many other aspects as is known to a skilled person.

The number of options available requires that many tools are made available to a user which in turn requires that a sizeable screen area is reserved for presenting these tools.

For image editing it is especially important that the image to be edited is allowed a large screen area so that the user can view the edited image clearly.

This presents a problem with small display apparatuses such as portable mobile communication devices and digital photographic cameras as the available display space is most often too small to both offer a user a reasonable portion of the display for showing the edited image and also for showing the available options.

Furthermore, to edit many aspects of an image requires many actions to be selected and executed and this is both time consuming and annoying to a user as the user has to select the appropriate tool and apply it for each effect to be applied. In prior art systems this problem has been solved by configuring automatic editing commands that perform many editing actions on (or in other words applies many effects to) an image by a single command. Such commands are usually labeled "Optimize image" or similar. These commands do not always provide a desirable result and the possibility of editing the image to the user's wishes is taken from the user.

An apparatus that allows fast and easy access to multiple editing actions while still allowing the user to maintain control of the editing process would thus be useful in modern day society.

SUMMARY

On this background, it would be advantageously to provide a user interface, an apparatus and a method that overcomes or at least reduces the drawbacks indicated above by providing an apparatus according to the claims.

According to a further aspect of the teachings herein to overcome or at least reduce the drawbacks indicated above an apparatus is provided, said apparatus comprising a controller and a memory storing instructions that when executed causes the controller to associate a first editing effect with a first editing direction; associate a second editing effect with a second editing direction; receive an editing input indicating an input direction and an input length; determine an editing degree according to a corresponding length of said input length in an editing direction by extracting a component corresponding to the input in the editing direction; and apply said associated editing effect in a degree according to the editing degree to an image.

According to a further aspect of the teachings herein to overcome or at least reduce the drawbacks indicated above an apparatus is provided, said apparatus comprising means for associating a first editing effect with a first editing direction; means for associating a second editing effect with a second editing direction; means for receiving an editing input indicating an input direction and an input length; means for determining an editing degree according to a corresponding length of said input length in an editing direction by extracting a component corresponding to the input in the editing direction; and means for applying said associated editing effect in a degree according to the editing degree to an image.

In one embodiment the apparatus further comprises means for determining a first editing degree for the first editing effect; means for determining a second editing degree for the second editing effect; and means for applying both said first editing effect to the first editing degree and said first editing effect to the first editing degree to an image.

In one embodiment the apparatus further comprises means for receiving input indicating a graphical object in said image; and means for applying the editing effect to that graphical object.

In one embodiment the apparatus further comprises means for associating a complementing editing effect to an editing effect with an editing direction being opposite to the editing direction being associated with the editing effect.

In one embodiment the editing input corresponds to a movement and the apparatus further comprises means for determining said input lengths and means for applying associated editing effects to the image while receiving the editing input.

Further features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which:

FIGS. 1a and 1b are views of each an apparatus according to an embodiment,

FIG. 2 is a block diagram illustrating the general architecture of an apparatus of FIG. 1a in accordance with the present application.

DETAILED DESCRIPTION

Figure 3A:
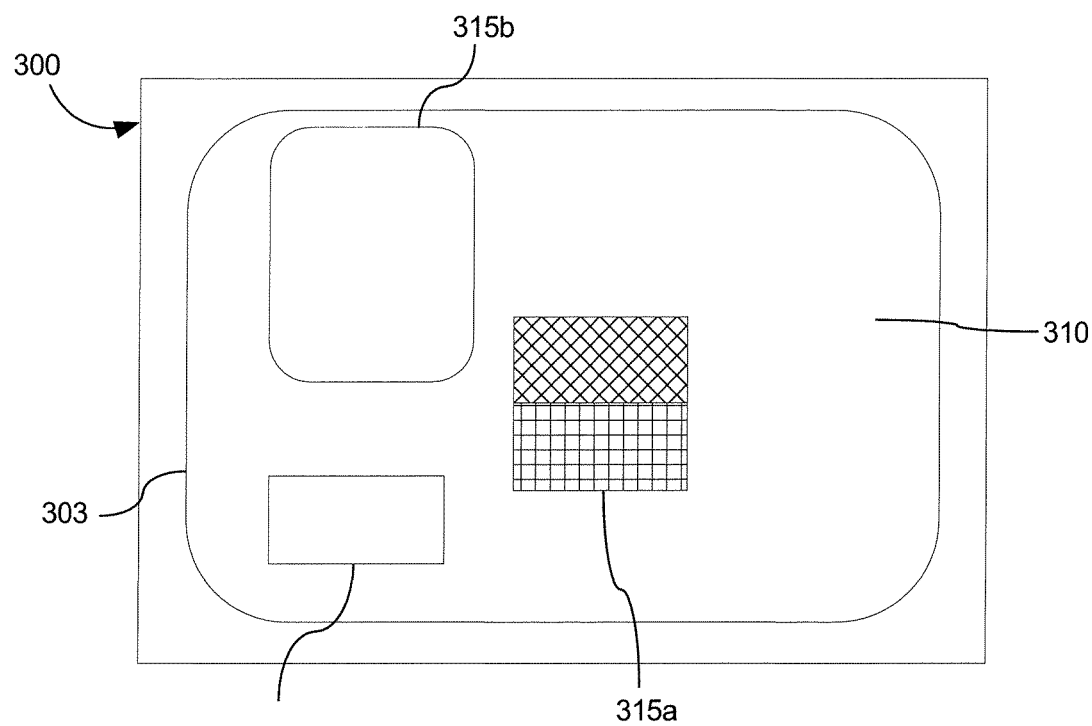
FIGS. 3a to 3d are screen shot views of an apparatus or according to an embodiment.

In the following detailed description, the user interface, the apparatus, the method and the software product according to the teachings for this application in the form of a cellular/mobile phone, such as a smartphone, will be described by the embodiments. It should be noted that although only a mobile phone is described the teachings of this application can also be used in any electronic device such as in portable electronic devices such as netbooks, desktop computers, laptops, PDAs, mobile communication terminals and other electronic devices offering access to information.

FIG. 1a illustrates a mobile terminal 100. The mobile terminal 100 comprises a speaker or earphone 102, a microphone 106, a main or first display 103 and a set of keys 104 which may include keys such as soft keys 104b, 104c and a joystick 105 or other type of navigational input device. In this embodiment the display 103 is a touch-sensitive display also called a touch display which displays various virtual keys 104a.

In one embodiment the terminal is arranged with a touch pad in addition to or as an alternative to the joystick 105.

An alternative embodiment of the teachings herein is illustrated in FIG. 1b in the form of a computer which in this example is a notebook computer 100. The computer has a screen 103, a keypad 104 and navigational means in the form of a cursor controlling input means which in this example is a touch pad 105.

The internal component, software and protocol structure of the mobile terminal 100 will now be described with reference to FIG. 2. The mobile terminal has a controller 200 which is responsible for the overall operation of the mobile terminal and may be implemented by any commercially available CPU ("Central Processing Unit"), DSP ("Digital Signal Processor") or any other electronic programmable logic device. The controller 200 has associated electronic memory 202 such as Random Access Memory, (RAM), Read Only Memory (ROM), Electrically Erasable Programmable Read-Only Memory (EEPROM), flash memory, or any combination thereof. The memory 202 is used for various purposes by the controller 200, one of them being for storing data used by and program instructions for various software in the mobile terminal. The memory may be formed by separate memory modules. The software includes a real-time operating system 220, drivers for a man-machine interface (MMI) 234, an application handler 232 as well as various applications 350. The applications can include applications for voice calling, video calling, sending and receiving messages such as Short Message Service (SMS), Multimedia Message Service (MMS) or email, web browsing, an instant messaging application, a phone book application, a calendar application, a camera application, one or more video games, a Global Positioning Service (GPS) application etc. It should be noted that two or more of the applications listed above may be executed as the same application.

The MMI 234 also includes one or more hardware controllers, which together with the MMI drivers cooperate with the first display 236/103, and the keypad 238/204 as well as various other Input/Output devices such as microphone, speaker, vibrator, ringtone generator, LED indicator, etc.

The software also includes various modules, protocol stacks, drivers, etc., which are commonly designated as 230 and which provide communication services (such as transport, network and connectivity) for an RF interface 206, and optionally a Bluetooth interface 208 and/or an IrDA interface 210 for local connectivity. The RF interface 206 comprises an internal or external antenna as well as appropriate radio circuitry for establishing and maintaining a wireless link to a base station.

In the following description it will be assumed that the display 103 is a touch display and that a tap is performed with a stylus or finger or other touching means tapping on a position on the display. It should be noted that a tap may also be included by use of other pointing means such as a mouse or touch pad controlled cursor which is positioned at a specific position and then a clicking action is performed. This analogy is commonly known in the field and will be clear to a skilled person. In the description it will be assumed that a tap input comprises a clicking action at an indicated position.

FIG. 3 shows a screen shot view of an apparatus 300 according to the teachings herein. It should be noted that such an apparatus is not limited to a mobile terminal, but can be any apparatus capable of editing images, such as notebooks, laptops, cameras, digital image viewers, media players, Personal Digital Assistants (PDA) and mobile phones.

The apparatus 300 has a display 303, which in this embodiment is a touch display.

In one embodiment a controller is configured to display an image 310 comprising one or more graphical objects 315a-c. In this example there are three graphical objects 315a-c in the image 310.

In this example we will focus on the object 315a (hereafter referred to simply as 315).

Graphical object 315 is shown in FIG. 3 as a rectangular object having two different shades. These are illustrative of color tone, brightness, softness (i.e. the effect achieved by applying a soft filter), contrast or other well-known image property.

The controller is configured to receive an input through the touch display 303 indicating the graphical object 315. In FIG. 3a the input is indicated with a finger.

In one embodiment a controller is configured to associate a first editing effect to a first editing direction 320. In this embodiment the direction 320 is taken to emanate from the center of the touch point.

The controller is further configured to receive input indicating a length in an editing direction.

Figure 3B:
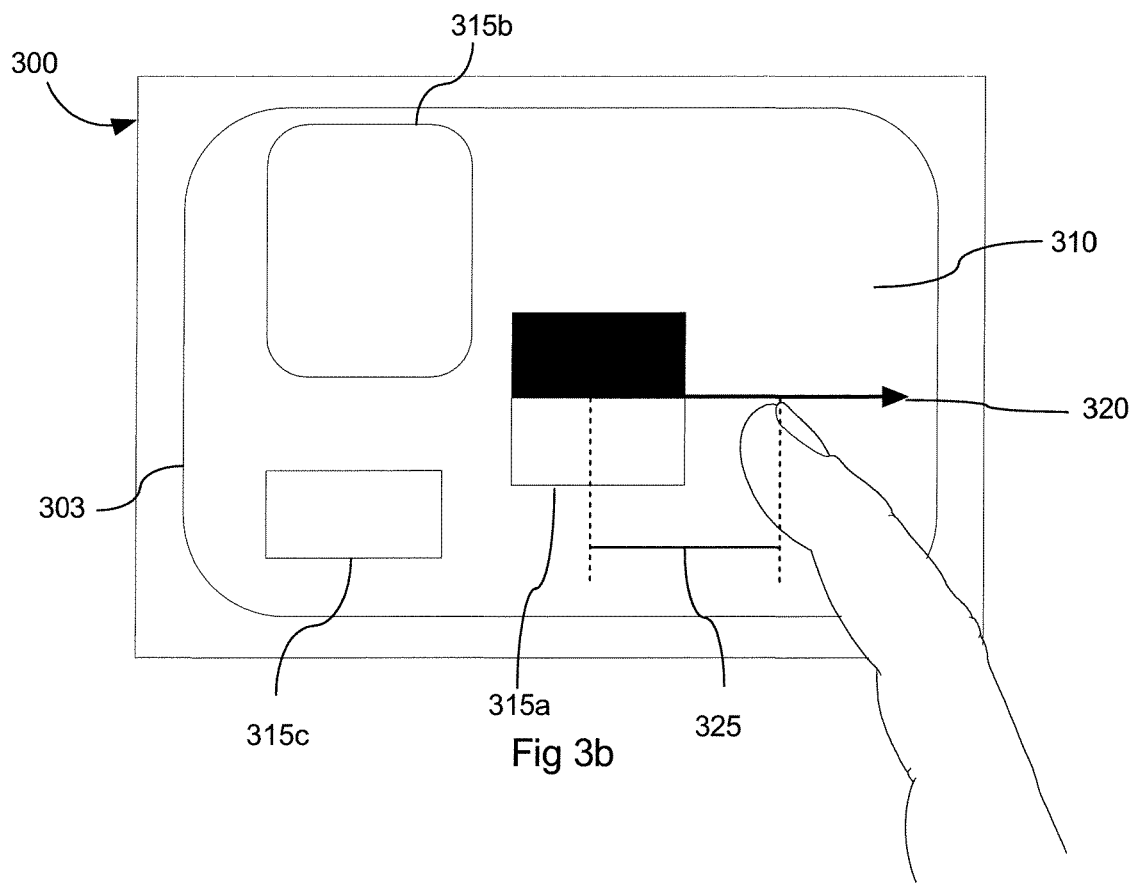

In FIG. 3b the user has moved his finger a distance 325 to the right. In this example the user has moved his finger in a direction coinciding with the first editing direction 320.

In this example the first editing effect of increasing the contrast is associated with the first editing direction 320.

The controller is configured to apply the editing effect (of increasing the contrast) to a degree corresponding to the input length 325 corresponding to the length in the editing direction 320.

In FIG. 3b the effect is shown as the two different shades having been changed for the graphical object 315.

Figure 3C:
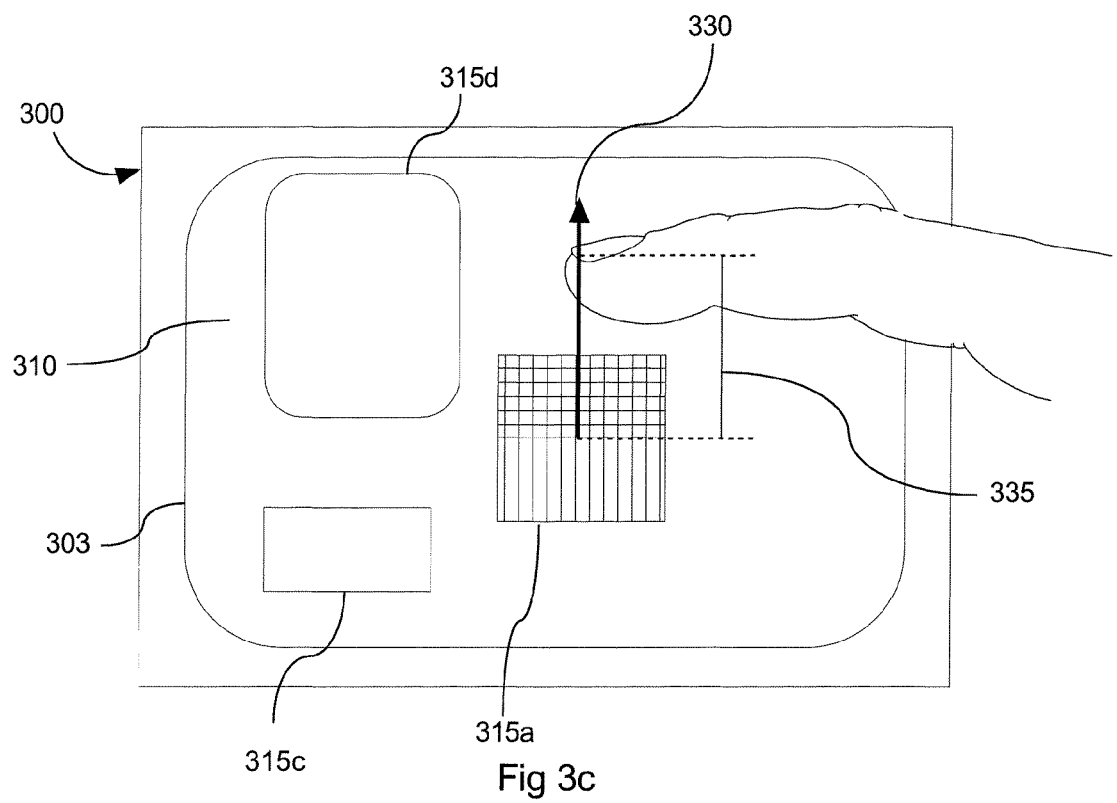
Figure 3D:
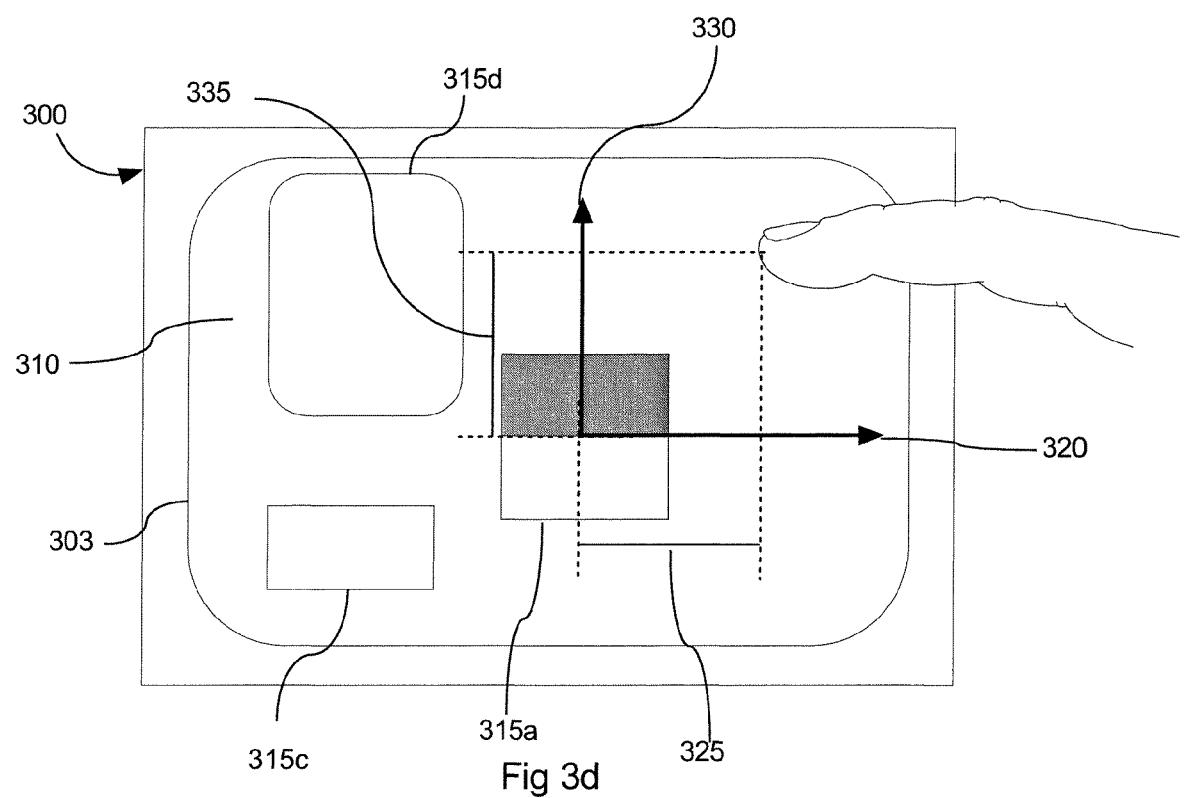

The controller is further configured to associate a second editing effect to a second editing direction 330, see FIG. 3c.

In FIG. 3c the user has moved his finger a distance 335 upwards. In this example the user has moved his finger in a direction coinciding with the second editing direction 330.

In this example the second editing effect of increasing the brightness is associated with the second editing direction 330.

The controller is configured to apply the editing effect (of increasing the brightness) to a degree corresponding to the input length 335 corresponding to the length in the editing direction 330.

In FIG. 3c the effect is shown as the two different shades having been changed for the graphical object 315.

In one embodiment the controller is configured to associate a complementing editing effect for an editing effect with a direction being opposite to the direction being associated with the editing effect.

In the example given in FIG. 3 the complementing editing effects would be for the first editing effect of increasing the contrast, to decrease the contrast if a movement to the left is received and for the second editing effect of increasing the brightness, to decrease the brightness if a movement downwards is received.

By associating effects to directions a user is able to edit a graphical object by a simple touch gesture on the display which in one input indicates the object to be edited, the effect to be used and to which extent to apply the effect. This greatly reduces the number of inputs necessary to perform the editing. It is also easy for a user to remember which effects are associated with which direction and therefore the whole palette of available tools need not be displayed as the most commonly used tolls are already associated with a direction.

In one embodiment the controller is configured to continuously apply the effect while the input is being received. This enables a user to directly see the results of the editing.

In the embodiment of FIG. 3 the two editing directions 320, 330 are orthogonal to one another. This provides a user with an editing space that is easy to manipulate and to understand as the two directions create the span with the extremes of each effect in the extreme of the corresponding edge of the space.

In one embodiment the controller is configured to display arrows indicating the editing directions. In one such embodiment the arrows are displayed when an input is received within the image 310. In one embodiment the arrows are provided with labels indicating the effect associated with the direction. In one embodiment the controller is configured to display a value indicating the degree of the effect to be applied corresponding to the distance of the input. For example through a label indicating that the contrast will be set to 80%.

FIGS. 4a-4e shows a schematic view of how editing effects can be associated to directions and how the effects are applied according to the input received.

Figure 4A:
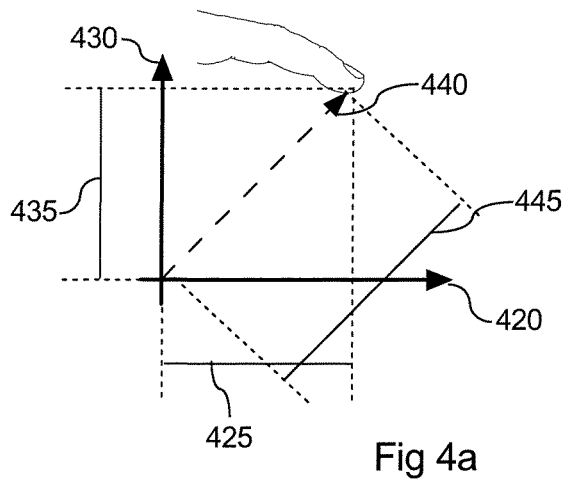
FIGS. 4a to 4e are schematic views of an association and resulting function according to an embodiment.

In FIG. 4a a first editing effect is associated with a first editing direction 420 and a second editing effect is associated with a second editing direction 430.

An editing input has been received indicating a distance 445 and a direction 440.

A controller is configured to determine an input length 425 in the first direction 420 and a second input length 435 in the second editing direction 430. In the example of FIG. 4a where the editing directions are orthogonal the input lengths 425 and 435 corresponds the components of the input in those directions and can easily be calculated using for example sine or cosine functions.

The controller is configured to apply both the first and the second editing effects in a degree corresponding to their respective input lengths 425, 435.

This enables a user to edit an image or an object using two effects simultaneously.

This overcomes the problem that when two effects are to be applied to an object the end result depends on which of the effects are applied first and the user has to choose which effect to apply first very carefully to obtain the desired result.

To apply two effects with simultaneous effect a user of prior art systems has to use each tool in a small step repeatedly which is very time consuming and annoying.

The embodiments disclosed herein overcome these problems by allowing a user to apply two effects at the same time in a manner that is highly intuitive to understand and very easy to use. A user is also able to play around and try to find the desired result much more easily using a singe stroke of a finger by indicating an object (or the whole image) and moving the stylus or finger around in the space created by the two editing directions.

Returning to FIG. 3d the situation where a user is simultaneously applying two effects to an object is shown.

Figure 4B:
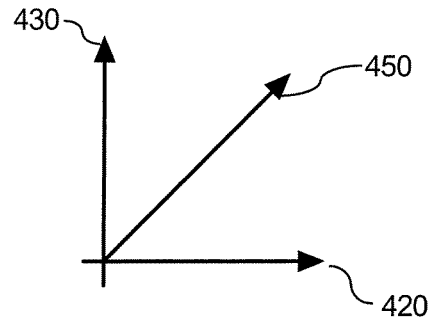

FIG. 4b shows an embodiment where three editing effects are associated with three editing directions. An apparatus can thus offer a user access to more than two editing effects while associating them to different directions.

In one embodiment a space between the three directions are also created for a user to move around in. In one such embodiment the third direction 450 is directed inwards (our outwards) of the display. This can be achieved by the use of a pressure sensitive touch display that is configured to relay information not only on the point of contact but also on the degree of contact. In this manner a user can increase the effect associated with the inwards direction by pushing harder on the display.

Figure 4C:
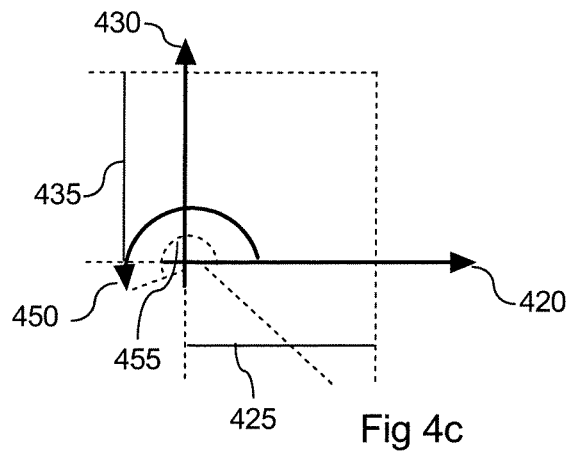

FIG. 4c shows an embodiment where three editing effects are associated with three editing directions, 420, 430, 450.

In this example the third editing direction 450' is radial and the input length 455' associated with it is an angular distance 455'.

Figure 4D:
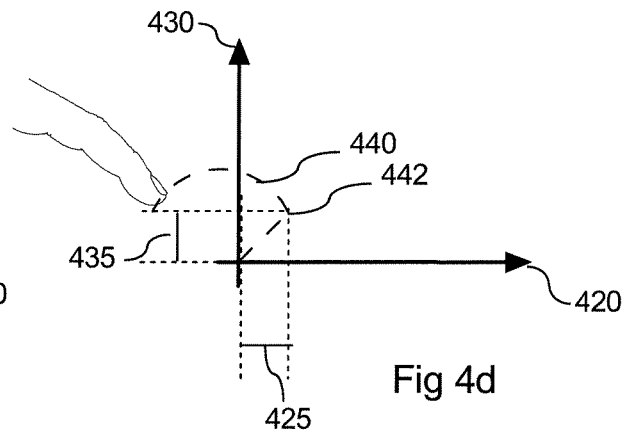
Figure 4E:
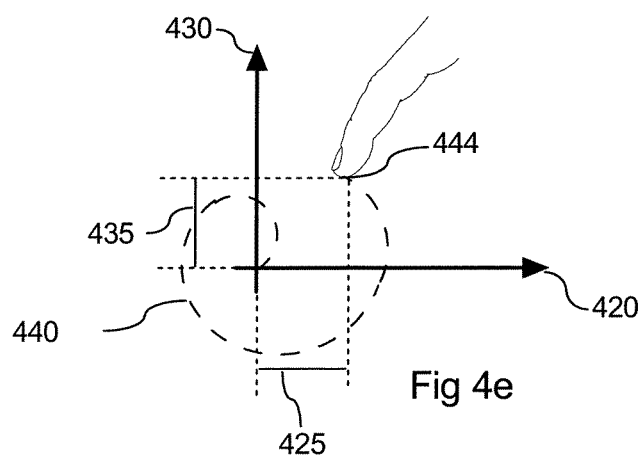

In one embodiment the controller is configured to determine the input lengths of the first and the second directions 420, 430 from a point where the rotational phase of the editing input 440 begins. In FIG. 4d this point is indicated as 442.

This allows a user to first apply the two editing effects associated with the first and second editing directions 420, 430 to a desired degree by dragging a stylus out in to the space created by these two editing directions and then to apply a third effect by continuing the swipe with a rotational movement.

In one embodiment the controller is configured to determine the input lengths of the first and the second directions 420, 430 from a point where the rotational phase of the editing input 440 ends. In FIG. 4d this point is indicated as 444.

This allows a user to apply a combination of the three editing effects associated with the first, second and third editing directions 420, 430, 450 to a desired degree by rotating a desired number of times and making sure to end up in the wanted position corresponding to the desired end result. This allows a user to perform complex editing operations with a single gesture. This finds particular use with standard transformations often made while still allowing a user to maintain control of the editing and to easily adjust the standard operation.

For example for a user to transform a picture from color to black and white the effect of changing the color saturation is associated to the rotational direction, the brightness to the vertical direction and the contrast to the horizontal direction a user can simply transform an object or an image by making a quick full turn rotation (setting the saturation to 0) and then by choosing the end point adjust the contrast and brightness to the wanted desire. Most often a transformation such as this can be applied to a range of images without only small variations needed for each individual image. Using prior art systems relying on standardized commands a user will have to select each tool individually to make the small changes. From a usability point of view there is no difference in making a small change and making a big change. Using an embodiment as described herein the difference for making the small changes is simply to select where to release the touch input (or in other words where to stop the editing gesture).

Figure 5A:
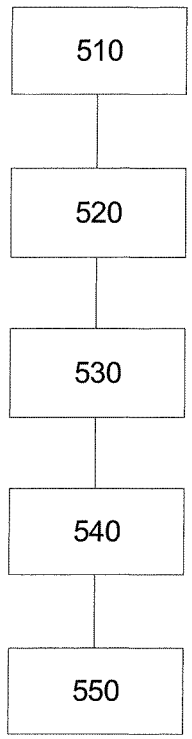
FIGS. 5a-5c present a series of flowcharts each illustrating a method according to an embodiment.

FIG. 5 shows a flow chart of a general method. At least one editing effect is associated to a corresponding number of editing directions 510. Input is received indicating a starting point 520 and followed by a movement indicating an input direction and an input distance 530 from the starting point. The input distance is matched against the editing directions and corresponding input lengths are determined 540 and the associated effects are applied in accordance with the input lengths 550.

Figure 5B:
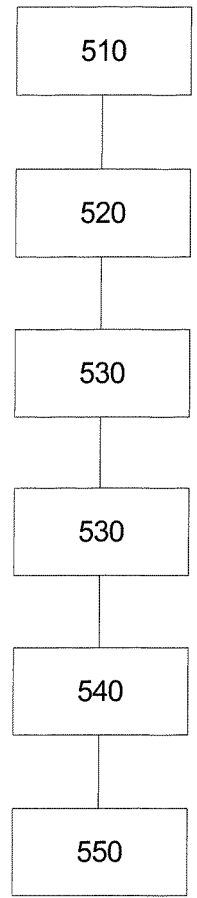

In one embodiment a graphical object is identified 525 from the starting point and the effect applied is applied to that graphical object, see FIG. 5b.

Figure 5C:
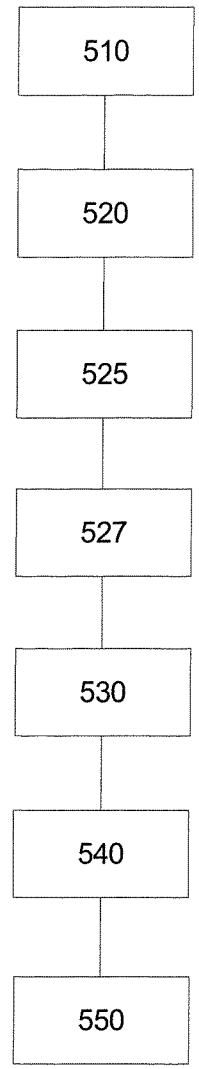

In one embodiment the controller is configured to determine 527 whether a graphical object has similar graphical objects in the vicinity and to treat these objects as one graphical object applying the effect to the group of objects, see FIG. 5c.

In one embodiment the controller is configured to determine that an object is similar if it has (approximately) the same color, if it is connected to the object and/or if it is within a certain distance from the object.

In one embodiment the controller is configured to apply the editing effect to an area having a size which size is dependant on a distance from the selected object in a pre-specified direction. In such an embodiment a second editing effect is seen as a function for determining the area to apply the first editing effect in.

In one embodiment the distance in the direction associated with the area determining function is proportionate to the radius of the area in which the editing effect is to be applied.

In one embodiment the distance in the direction associated with the area determining function is proportionate to a side of a square being the area in which the editing effect is to be applied.

In one embodiment the area is determined by an editing mask. In such an embodiment the size of the editing mask is proportionate to the distance from the selected object.

In one embodiment the area is displayed with the applied effect as the size of the area is being determined. This allows a user to see how big the area is and which objects and/or pixels are affected by the editing effect.

In one embodiment an apparatus comprises a multiple-way navigation input device such as a four-way navigation input key or a joystick. In one embodiment the input device is a five-way input key or joystick for which the middle direction indicates a select operand.

In one embodiment the controller is configured to receive directional navigation input through the multiple-way navigation input device and in response thereto display a cursor on a display at a position that varies according to the directional navigation input. The controller is further configured to receive a select operand input indicating a position and in response thereto select an object being displayed at this position. The controller is further configured to associate a direction with an editing action and to receive further directional navigation input indicating a direction and to execute an editing action being associated with the direction to the object as a further select operand input is received.

In such an embodiment the apparatus is configured to receive input to select an object and to perform editing actions as has been described above with reference to a touch display by using a hardware key such as a navigation key or a joystick.

In such an embodiment a touch display tap corresponds to a select operand input and a stroke corresponds to stepwise or repeated input of the navigation key in one or more directions and a release of the touch corresponds to a further select operand input.

In one embodiment the controller is configured to receive multi-touch input comprising a direction and to associate a multi-touch input and the direction with an editing action and upon receipt of a multi-touch input execute the associated editing action.

Figure 6:
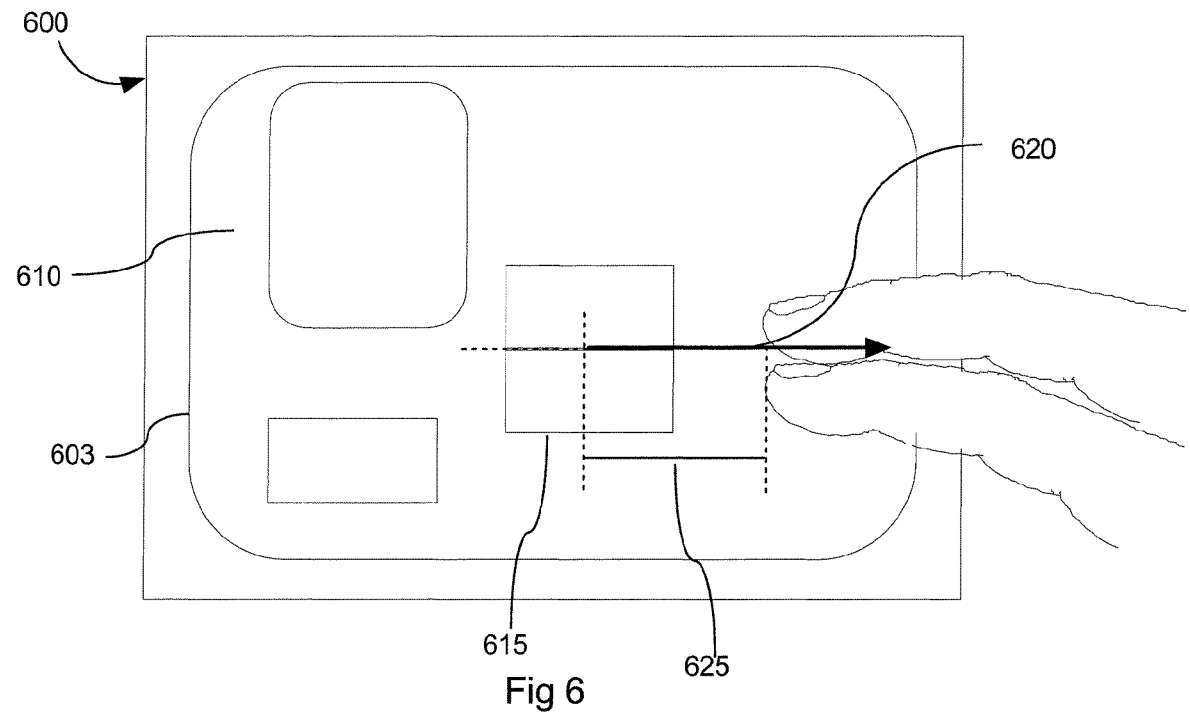
FIG. 6 is a screen shot view of an apparatus or according to an embodiment.

FIG. 6 shows a screen shot view of an apparatus 600 according to the teachings herein. It should be noted that such an apparatus is not limited to a mobile terminal, but can be any apparatus capable of editing images, such as notebooks, laptops, cameras, digital image viewers, media players, Personal Digital Assistants (PDA) and mobile phones.

The apparatus 600 has a display 603, which in this embodiment is a touch display. In one embodiment the touch display 603 is a capacitive touch display capable of receiving multi-touch gestures.

In one embodiment the controller is configured to associate an input and to determine the number of contact points (i.e. the number of touch points or fingers in the user input is being used) and to execute an editing action being associated with the input, wherein the editing action is dependant on the number of contact points.

In one embodiment the controller is configured to associate a direction with an editing action and according to the number of touch points received.

In one embodiment the controller is configured to associate a second function with a direction for two touch points.

In one embodiment the controller is configured to associate a third function with a direction for three touch points.

In one embodiment the controller is configured to associate a fourth function with a direction for four touch points.

In FIG. 6a a user is using two fingers to make an editing command.

As in the examples of FIG. 3 a user has identified an object 615 by touching on it and then indicated an editing action by dragging or moving the touch point in a direction 620 from the selected object 615. In this example the user has moved his fingers to the right.

In this example two fingers are used and the selected and executed editing action depends on the number of fingers being used. It should be noted that even though the description refers to finger input other means of touch input may be used such as styluses.

In one embodiment the second, third or fourth editing action is the complementary to or inverse of the first editing action associated with the direction.

In this example the direction 620 (right) is associated with the function of increasing the brightness and the multi-touch input gesture for two touch points is associated with the inverse of increasing the brightness, namely to decrease the brightness.

This has the benefit that a user will intuitively understand the grouping of the actions associated with the directions and thus more easily use the editing actions.

In one embodiment the second, third or fourth editing action is supplemental editing action to the first editing action associated with the direction.

In one example the first editing action is to increase the brightness and the second, third or fourth editing action is to increase the contrast. In such an example a user is able to increase the brightness and the contrast simultaneously by making a gesture in a direction with more than one finger. This also has the advantage that it is easier for a user to learn the directions of editing actions as the actions are grouped according to similar function.

In one embodiment the controller is configured to receive a multi-touch input and to execute a corresponding editing action (possibly being a combined effect) being associated with a direction and the number of touch points and to apply that editing effect while the number of touch inputs remains unchanged.

In one embodiment the controller is configured to cancel a first editing effect associated with a first number of touch inputs and to apply a second editing effect associated with a second number of touch points as the number of touch points change during a multi-touch input gesture.

A user is thus able to replace the first editing effect with a second editing effect by switching the number of fingers without having to cancel the gesture and make a new gesture.

A user is thus able to compare the effect of different editing actions by simply changing the number of fingers touching the display 603. In one example where the editing action of increasing the brightness is associated with a one finger input and the editing action of increasing the contrast is associated with a two-finger input a user is able to compare the effects of the two editing actions by simply identifying an object 615, dragging a finger (or two) in the associated direction and then by applying or releasing the other finger to the display 603 switch between the two editing effects. As the multi-touch input gesture is released (all fingers released) the latest displayed version is (temporarily) saved and applied to the selected object.

In one embodiment the controller is configured to receive a multi-touch input indicating a direction and to execute a first editing action (possibly a combined editing action) in accordance with a first number of touch points and the direction and as a change in the number of touch points is detected apply the first editing action to a selected object and to apply a second editing action being associated with the second number of touch points and the direction to an extent proportionate to the total distance of the touch input.

This allows a user with the possibility of editing an image by selecting an object by touching on it and to drag in a direction from the object using for example two fingers to apply the combined effect of increasing both the contrast and the brightness and then to further increase one of these effects by releasing one finger. In this example the editing action of increasing the brightness being associated with a one-finger touch input and the editing action of increasing the contrast and the brightness being associated with a two-finger input. The extent to which the two effects are applied is for the combined editing effect proportionate to the distance from the start point to where the number of touch points changed and for the single effect (i.e. to increasing the brightness) proportionate to the total distance for the gesture.

In one embodiment the controller is configured to receive a multi-touch input indicating a direction and to execute a first editing action (possibly a combined editing action) in accordance with a first number of touch points and the direction and as a change in the number of touch points is detected apply the first editing action to a selected object and to apply a second editing action being associated with the second number of touch points and the direction to an extent proportionate to the distance of the touch input from where the number of touch points changed.

This allows a user with the possibility of editing an image by selecting an object by touching on it and to drag in a direction from the object using for example two fingers to apply the effects of increasing both the contrast and the brightness and then to further increase one of these effects by releasing one finger. In this example the editing action of increasing the brightness being associated with a one-finger touch input and the editing action of increasing the contrast being associated with a two-finger input. The increase in contrast is proportionate to the distance of the two finger gesture, that is from the selected object to the point where the number of touch points changes. The increase in brightness is proportionate to the distance of the one finger gesture that is from where the number of touch points changes to the release of the gesture.

This allows a user to apply multiple editing actions to different extents without having to re-select an object.

In one embodiment one of the second, third or fourth editing actions is the inverse of the combination of the other editing actions. A user is thus able to execute two editing actions by using the associated number of fingers for achieving a combined editing effect and then to execute the inverse of the combined effect by an extra touch point.

In one embodiment the controller is configured to first receive an input comprising at least one first touch point, said input indicating a first direction and to execute an editing action associated with the input and the first direction and then to receive a further input comprising a further touch point and a second direction and to execute a second editing action associated with said first editing action and a second direction of said further input.

This allows a user to perform a two-step editing operation.

Figure 7A:
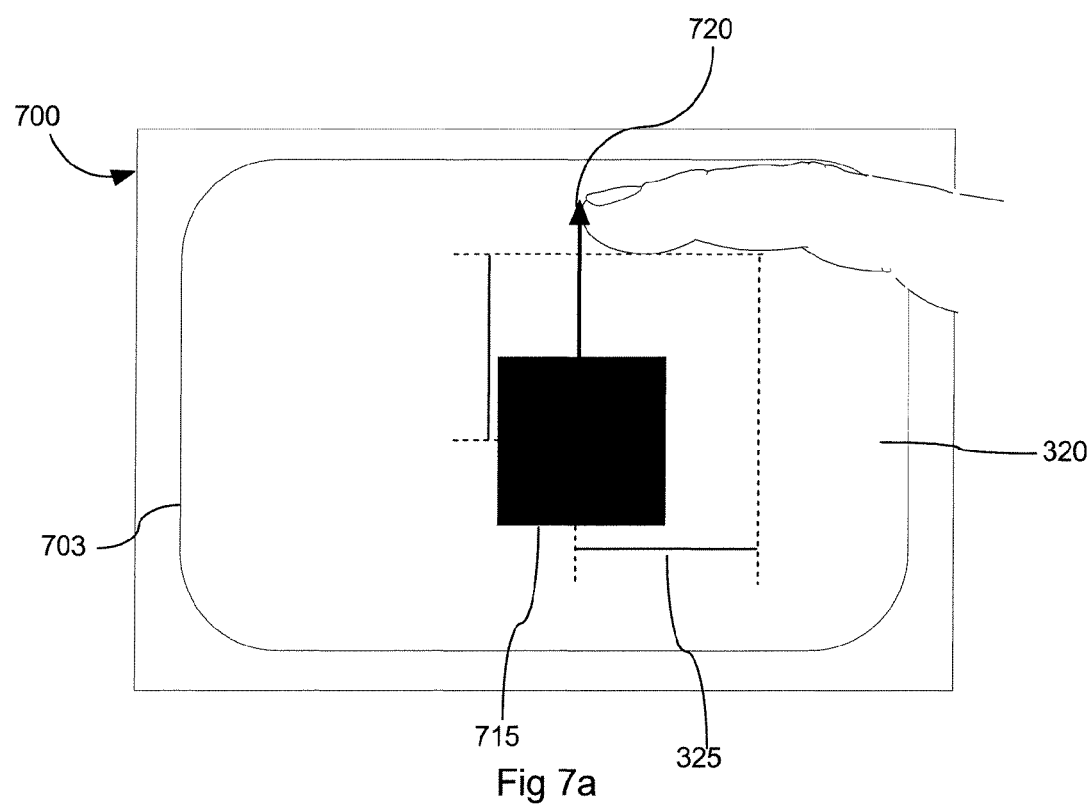
FIGS. 7a to 7c are screen shot views of an apparatus or according to an embodiment.
Figure 7B:
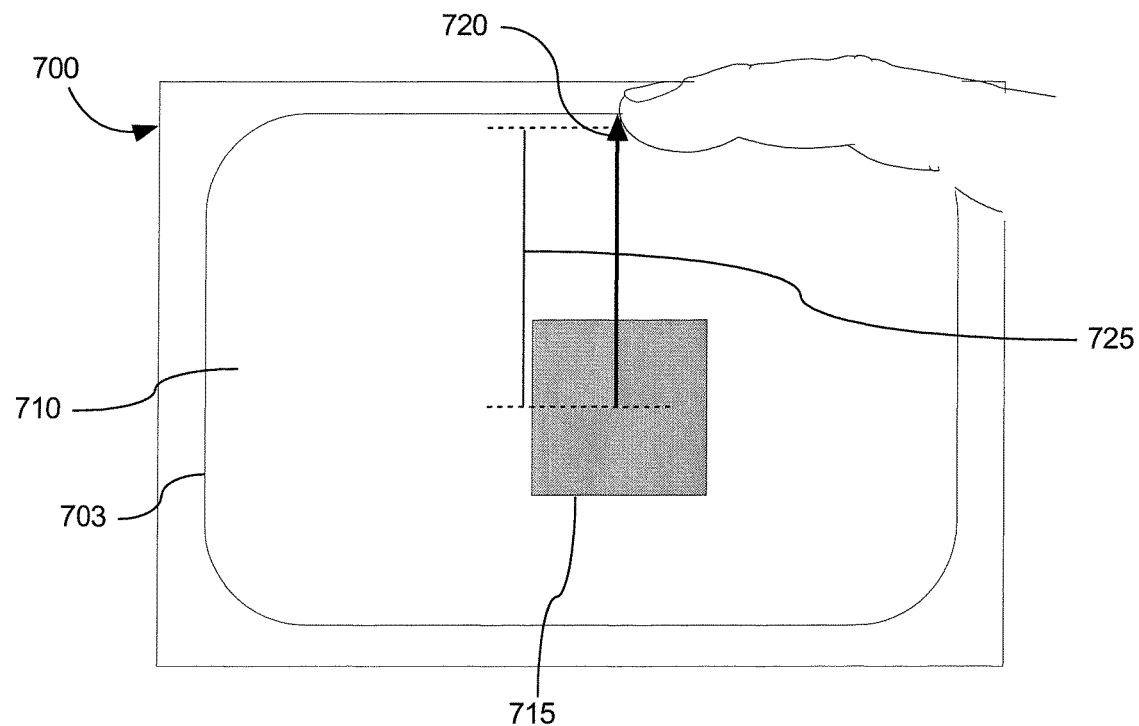
Figure 7C:
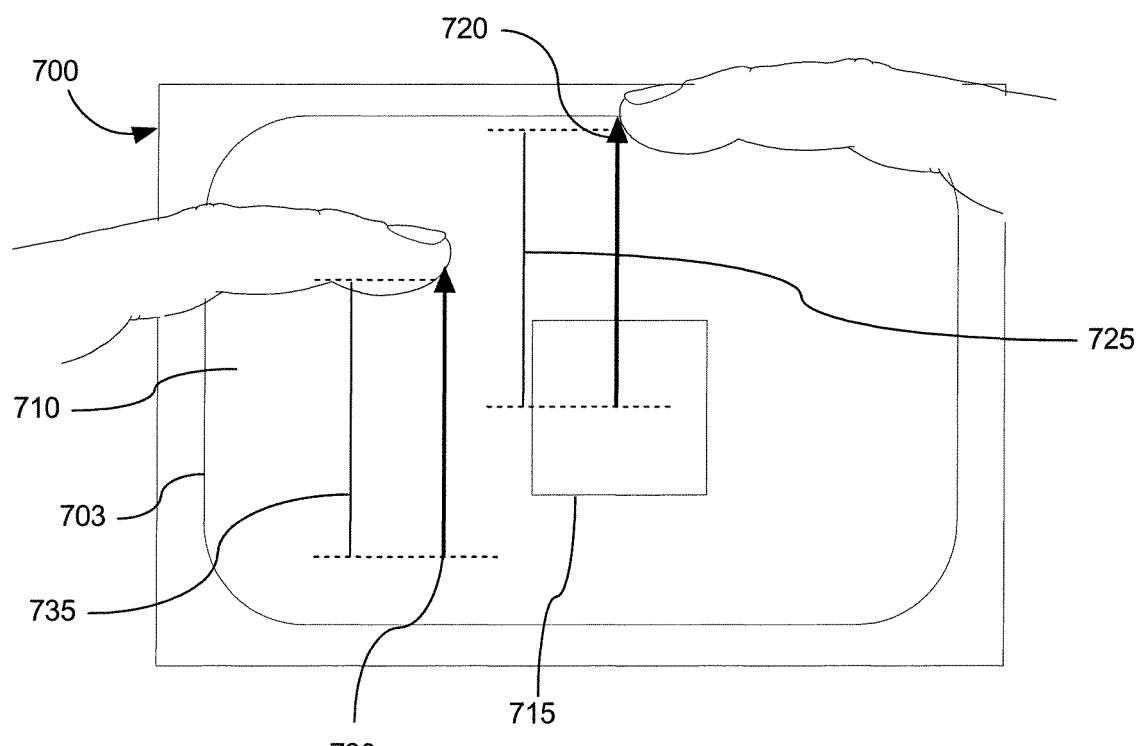

FIGS. 7a-7c show screen shot views of an apparatus 700 according to the teachings herein. It should be noted that such an apparatus is not limited to a mobile terminal, but can be any apparatus capable of editing images, such as notebooks, laptops, cameras, digital image viewers, media players, Personal Digital Assistants (PDA) and mobile phones.

The apparatus 700 has a display 703, which in this embodiment is a touch display. In one embodiment the touch display 703 is a capacitive touch display capable of receiving multi-touch gestures.

In the example of FIG. 7a a user has selected an object 715 and applied an editing effect, which in this example is to increase the brightness of the object 715, by dragging his finger upwards.

In FIG. 7b the effect has been applied to the object 715 by the controller.

In one embodiment the controller is further configured to associate a second or further input with a further editing effect, which in this example is to change the extent of the effect applied.

In one embodiment the controller is further configured to associate the change with a second direction comprised in the further input.

In one embodiment the controller is further configured to associate an increase of the extent with one direction. In one embodiment this direction is upwards. In one embodiment this direction is leftwards. In one embodiment this direction is rightwards.

In one embodiment the controller is further configured to associate a decrease of the extent with one direction. In one embodiment this direction is downwards. In one embodiment this direction is rightwards. In one embodiment this direction is leftwards.

The user is thus able to amend the extent to which the effect should be applied. This is useful for a fine-tuning of the effect's application.

In such an embodiment the extent is proportionate to the distance of the further input using a different scaling factor as for the first editing action and first direction. In one embodiment the scaling factor for the further input is lower than for the first input meaning that the extent applied for a given distance is lower for the further input than for the first input.

This is also useful if the first input reaches an edge of the display 703 or an application window 710 before the user has managed to apply the wanted extent of the effect. A user can then further increase the extent by (repetitively) dragging with a second finger.

In such an embodiment the extent is proportionate to the distance of the further input using the same scaling factor as for the first editing action and first direction.

In FIG. 7b a user has dragged his finger to the upper edge of the application window 710 and the effect of increasing the brightness as been applied to the object 715 to an extent being proportionate to the distance 725 in the first direction 720, which in this example is upwards.

To further increase the effect of the editing action that is to further increase the brightness a user touches on the display 703 with a second finger (in the figure it is the leftmost finger) thus inputting a further input to the processor of the apparatus.

In FIG. 7c a user has touched on the display 703 and dragged the further finger in a second direction 730 a distance 735. In this example the controller has associated the further input to the editing action of increasing the extent (proportionate to the first distance 725) of the first editing action by a second extent being proportionate to the distance 735 of the further finger's movement. In this example the brightness has clearly increased further compared to FIG. 7b.

This enables for an easy manner of differentiating between a further application of an editing effect to a selected object and a new gesture indicating a new object and a new editing action.

In one embodiment the controller is configured to associate a second editing action not being related to the first editing action. In one such example embodiment the first editing action is to increase the brightness and the second editing action is to increase the contrast.

This allows a user to apply an editing effect and then to fine-tune the image editing by applying a second effect with a second finger to a different degree which allows a user to easily see how the two effects combine and affect the selected object.

In one embodiment the controller is configured to determine a second object from the touch point of the further input and to apply the first editing action to the second object as well as to the first object.

This allows a user to apply the same effect to more than one object without having to repeat the gestures needed to perform the editing effect.

FIGS. 8a-8e show screen shot views of an apparatus 800 according to the teachings herein. It should be noted that such an apparatus is not limited to a mobile terminal, but can be any apparatus capable of editing images, such as notebooks, laptops, cameras, digital image viewers, media players, Personal Digital Assistants (PDA) and mobile phones.

The apparatus 800 has a display 803, which in this embodiment is a touch display. In one embodiment the touch display 803 is a capacitive touch display capable of receiving multi-touch gestures.

Figure 8A:
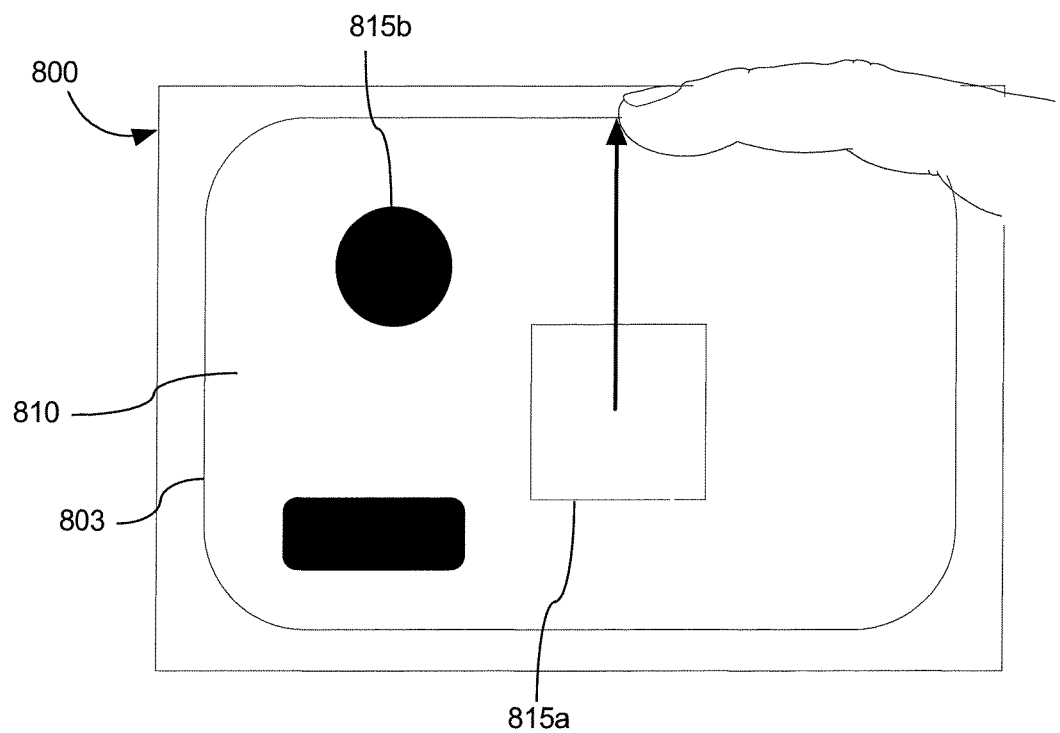
FIGS. 8a to 8e are screen shot views of an apparatus or according to an embodiment.

In the example of FIG. 8a a user has selected a first object 815a and applied an editing effect, which in this example is to increase the brightness of the first object 815a, by dragging his finger upwards.

Figure 8B:
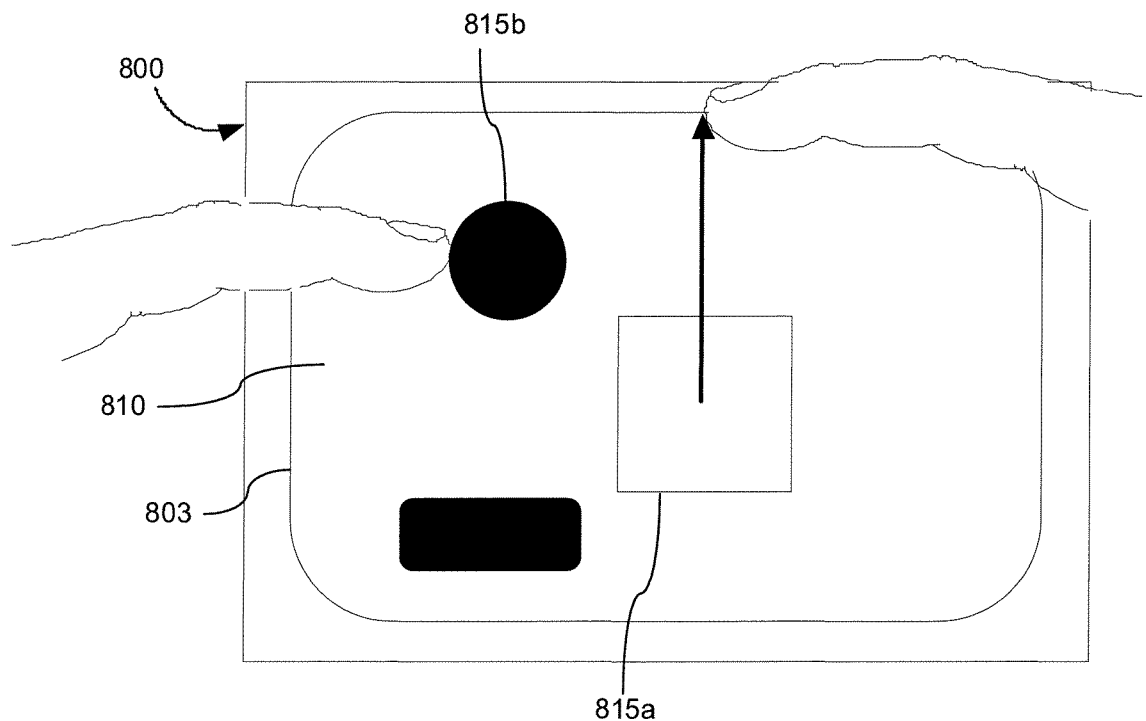
Figure 8C:
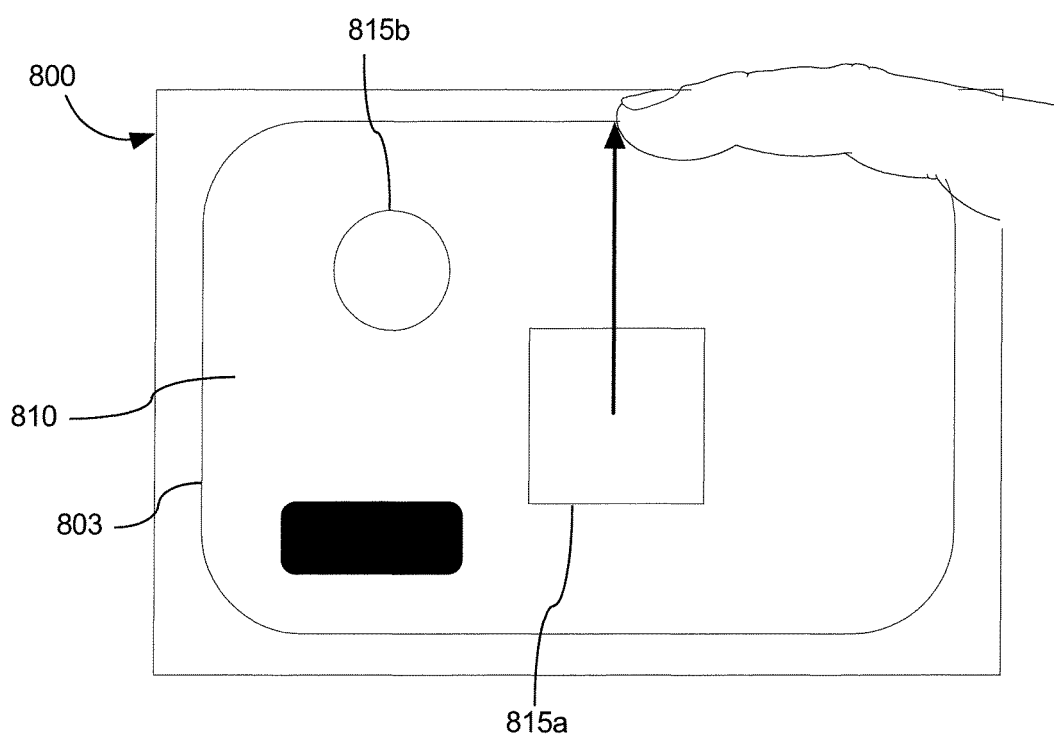

In FIG. 8b a further touch input is received by the user touching on a second object 815b and in FIG. 8c the same editing effect as was applied to the first object 815a has been applied to the second object 815b.

In one embodiment the controller is configured to receive additional further inputs indicating additional second objects 815c and to apply the effect to those objects as well.

In one embodiment the controller is configured to receive a further input indicating an object which the first editing effect has already been applied to and in response thereto cancel the applied editing effect.

Figure 8D:
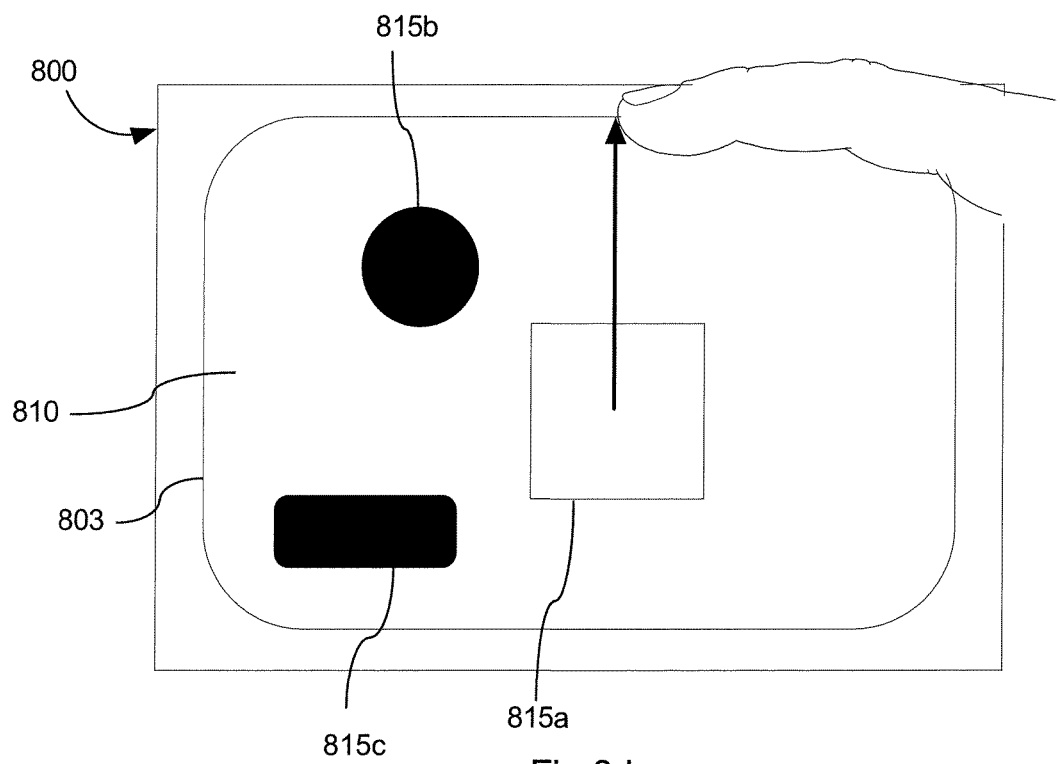

In FIG. 8d the second object 815b has been touched again and the applied effect has been cancelled or reversed.

In a further embodiment the further input comprises a further distance and the controller is configured to apply the first editing action to the second selected object to an extent proportionate to the further distance.

Figure 8E:
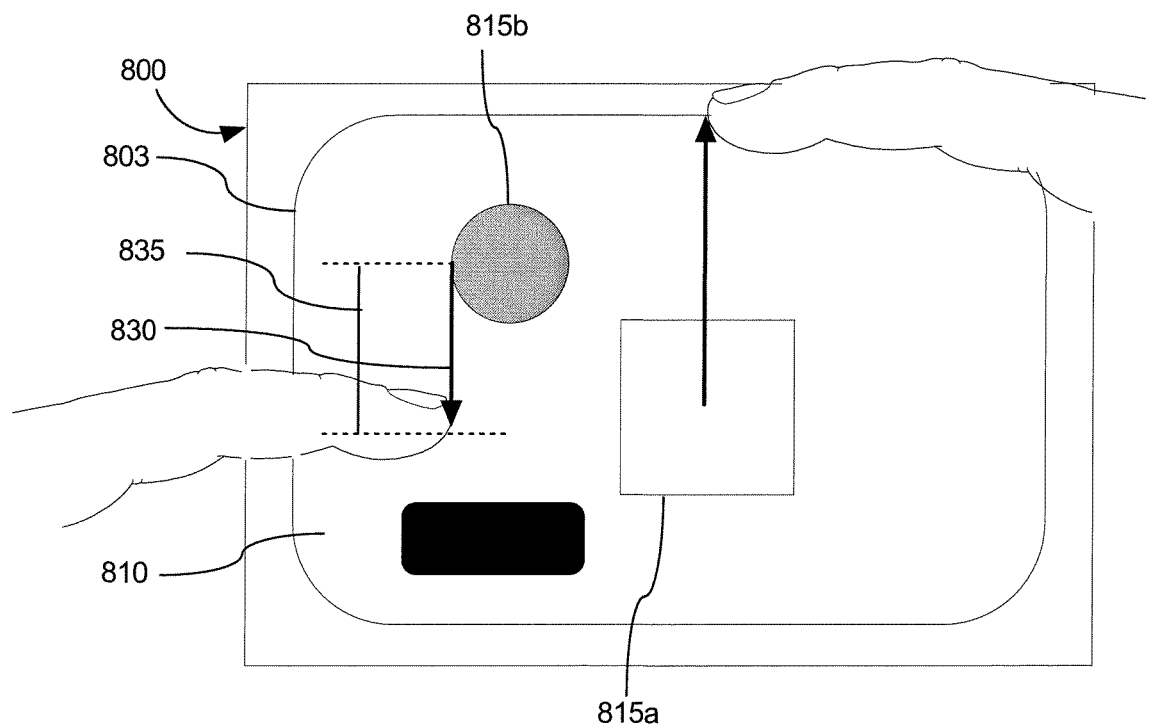

In FIG. 8e a user has touched on the second object 815b and dragged his finger in a further direction 830 a further distance 835. In this example the further direction is downwards.

The first editing action has been applied to the second object 815 to an extent proportionate to the further distance 835.

In one embodiment the controller is configured to apply the first editing action to a lower extent for a first further direction 830. In one embodiment the first further direction is downwards.

In one embodiment the controller is configured to apply the first editing action to a higher extent for a second further direction 830. In one embodiment the second further direction is upwards.

In one embodiment the controller is configured to apply the first editing action to a second extent being proportionate to the further distance 835 in a third further direction 830. In one embodiment the third further direction is leftwards. In one embodiment the third further direction is rightwards.

In one embodiment the controller is configured to associate a further editing action with said further direction and to apply said further editing action to said second object (815b) in addition to applying the first editing action to the second object.

In an example the first editing action is to increase the brightness and the further editing action is to increase the contrast.

A user is thus able to apply the same effect to multiple objects while still being able to quickly edit the further objects using additional editing actions without having to repeat the first editing action to the further objects individually. This also allows a user to see how the first effect can be altered for each further object without first having to select which further objects to apply the first effect to and then individually further edit them. Thus the first editing action need only be taken once for all objects selected.

It should be noted that even though the description above is focused on selecting individual objects the teachings are also applicable to selections of clusters of objects or areas.

In one embodiment the controller is configured to receive a further input indicating a direction from said first touch point and to search for additional objects in that direction and to apply the editing action to the additional objects found.

In one embodiment the controller is configured to search for additional objects being similar in color and/or shape to the first object.

In one embodiment the controller is configured to receive a further input indicating a further position at a distance from said first touch point and to apply the editing action to additional objects found in the area between the first object and the further position.

This allows a user to edit one object and then have the same effect being applied to objects surrounding the first object in a specified direction.

In one embodiment the controller is configured to receive a further input indicating a further position at a distance from said first touch point and to apply the editing action to the area between the first object and the further position.

This allows a user to edit one object and then have the same effect being applied to the surroundings in a specifically indicated area.

In one such embodiment the controller is configured to apply the editing effect at a varying extent. In one such embodiment the extent varies with the distance from the first touch point. In one such embodiment the extent decreases with the distance from the first touch point.

This allows a user to gradually apply the effect to the surroundings.

It should be noted that a selection method as described above only requires one input from a user, namely the gesture that both selects the originating point and identifies the editing effect and to which degree it should be applied. Furthermore this is all done in a single action from a user point of view.

It should be noted that the teachings above are also applicable to editing video.

The various aspects of what is described above can be used alone or in various combinations. The teaching of this application may be implemented by a combination of hardware and software, but can also be implemented in hardware or software. The teaching of this application can also be embodied as computer readable code on a computer readable medium or computer readable storage medium. It should be noted that the teaching of this application is not limited to the use in mobile communication terminals such as mobile phones, but can be equally well applied in Personal digital Assistants (PDAs), game consoles, media players, personal organizers, computers, digital cameras or any other apparatus designed for editing image or video files.

The teaching of the present application has numerous advantages. Different embodiments or implementations may yield one or more of the following advantages. It should be noted that this is not an exhaustive list and there may be other advantages which are not described herein. For example, one advantage of the teaching of this application is that a user will more quickly and efficiently apply editing effects to an image or an object in an image while allowing the image to be displayed fully allowing the user to maintain control of complex editing operations.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone and a laptop computer, it should be appreciated that the teachings of the present application may also be applied to other types of electronic devices, such as media players, video players, photo and video cameras, palmtop, netbooks, laptop and desktop computers and the like. It should also be noted that there are many alternative ways of implementing the methods and apparatuses of the teachings of the present application.

Features described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

What is claimed is:

1. An apparatus comprising a controller and a memory including computer instructions, wherein the memory and the computer instructions are configured to, with said controller, cause the apparatus to at least perform:
   associate a first editing effect with a first editing direction;
   associate a second editing effect with a second editing direction, wherein the second editing effect is a function to determine an area within an image within which to apply the first editing effect;
   receive an editing input indicating an input direction and an input length by receiving a single stroke that extends in both the first editing direction and the second editing direction so as to provide input for both the first and the second editing effects, respectively;
   determine a first editing degree according to a corresponding length of said input length in the first editing direction by extracting a component corresponding to the input in the first editing direction; and
   apply said first editing effect in a degree according to the first editing degree to the area within the image that is determined by the second editing effect, wherein the first editing effect is applied while the editing input is being received, and wherein the area to which the first editing effect is applied is only a portion of the image that is presented following application of the first editing effect.

2. An apparatus according to claim 1, wherein the controller is configured to:
   receive the editing input by receiving an editing input that extends in both the first editing direction and the second editing direction so as to provide input for both the first and the second editing effects, respectively; and wherein the controller is further configured to:
   determine a second editing degree for the second editing effect; and
   apply both said first editing effect to the first editing degree and said second editing effect to the second editing degree to the image.

3. An apparatus according to claim 1, wherein the controller is configured to:
   receive input indicating a graphical object in said image; and
   apply the first editing effect to that graphical object.

4. An apparatus according to claim 3, wherein the editing input comprises a stroke comprising a starting point and a movement direction to an end point, wherein said starting point is indicative of the graphical object and said controller is configured to determine the input length from the end point.

5. An apparatus according to claim 1, wherein the controller is configured to:
   associate a complementing editing effect to an editing effect with an editing direction being opposite to the first editing direction being associated with the first editing effect.

6. An apparatus according to claim 1, wherein said first editing direction is orthogonal to said second editing direction.

7. An apparatus according to claim 1, wherein an editing direction is radial and the editing input comprises a radial movement and an angular distance of said radial movement corresponds to an input length in the associated editing direction.

8. An apparatus according to claim 1, wherein the touch input comprises a plurality of touch points and said controller is configured to associate a second editing action with a second touch point and to execute said second editing action.

9. An apparatus according to claim 1, wherein the touch input comprises a plurality of touch points and said controller is configured to associate an editing action with a number of touch points and a direction.

10. An apparatus according to claim 1, wherein the editing input corresponds to a movement and the controller is configured to: determine said input lengths and apply associated editing effects to the image while receiving the editing input.

11. An apparatus according to claim 1, wherein the controller is further configured to identify an object to which the first editing effect is to be applied based upon a starting point for the editing input.

12. An apparatus according to claim 11, wherein the controller is further configured to apply the first editing effect to a group of objects that are similar to the object that has been identified.

13. A method comprising:
associating a first editing effect with a first editing direction;
associating a second editing effect with a second editing direction, wherein the second editing effect is a function to determine an area within an image within which to apply the first editing effect;
receiving an editing input indicating an input direction and an input length by receiving a single stroke that extends in both the first editing direction and the second editing direction so as to provide input for both the first and the second editing effects, respectively;
determining a first editing degree according to a corresponding length of said input length in the first editing direction by extracting a component corresponding to the input in the editing direction; and
applying, with a controller and an associated non-volatile memory, said first editing effect in a degree according to the first editing degree to the area within the image that is determined by the second editing effect, wherein applying the first editing effect comprises applying the first editing effect while the editing input is being received, and wherein the area to which the first editing effect is applied is only a portion of the image that is presented following application of the first editing effect.

14. A method according to claim 13, wherein receiving the editing input comprises receiving an editing input that extends in both the first editing direction and the second editing direction so as to provide input for both the first and the second editing effects, respectively, and wherein said method further comprises:
determining a second editing degree for the second editing effect; and
applying both said first editing effect to the first editing degree and said second editing effect to the second editing degree to the image.

15. A method according to claim 13, said method further comprising:
receiving input indicating a graphical object in said image; and
applying the first editing effect to the graphical object.

16. A method according to claim 15, wherein the editing input comprises a stroke comprising a starting point and a movement direction to an end point, wherein said starting point is indicative of the graphical object and said method further comprising determining the input length from the end point.

17. A method according to claim 13, said method further comprising:
associating a complementing editing effect to an editing effect with an editing direction being opposite to the first editing direction being associated with the first editing effect.

18. A method according to claim 13, wherein said first editing direction is orthogonal to said second editing direction.

19. A method according to claim 13, wherein an editing direction is radial and the editing input comprises a radial movement and an angular distance of said radial movement corresponds to an input length in the associated editing direction.

20. A method according to claim 13, wherein the editing input corresponds to a movement and said method further comprising:
determining said input lengths and applying associated editing effects to the image while receiving the editing input.

21. A method according to claim 13, wherein the touch input comprises a plurality of touch points and said method further comprises associating a second editing action with a second touch point and executing said second editing action.

22. A method according to claim 13, wherein the touch input comprises a plurality of touch points and said method comprises associating an editing action with a number of touch points and a direction.

23. A method according to claim 13, further comprising identifying an object to which the first editing effect is to be applied based upon a starting point for the editing input.

24. A method according to claim 23, wherein applying the first editing effect comprises applying the first editing effect to a group of objects that are similar to the object that has been identified.

25. A non-transitory computer readable medium comprising at least computer program code for controlling an apparatus, said computer readable medium comprising:
software code for associating a first editing effect with a first editing direction;
software code for associating a second editing effect with a second editing direction, wherein the second editing effect is a function to determine an area within an image within which to apply the first editing effect;
software code for receiving an editing input indicating an input direction and an input length by receiving a single stroke that extends in both the first editing direction and the second editing direction so as to provide input for both the first and the second editing effects, respectively;
software code for determining a first editing degree according to a corresponding length of said input length in the first editing direction by extracting a component corresponding to the input in the editing direction; and
software code for applying said first editing effect in a degree according to the first editing degree to the area within the image that is determined by the second editing effect, wherein the first editing effect is applied while the editing input is being received, and wherein the area to which the first editing effect is applied is only a portion of the image that is presented following application of the first editing effect.

26. A computer readable medium according to claim 25, wherein the computer program code further comprises software code configured to identify an object to which the first editing effect is to be applied based upon a starting point for the editing input.

27. A computer readable medium according to claim 26, wherein the software code for applying the first editing effect comprises software code for applying the first editing effect to a group of objects that are similar to the object that has been identified.

* * * * *